April 14, 1970     J. R. HALSTEAD ET AL     3,505,998
COMBINED CANINE OXYGEN MASK WITH HARNESS
Filed Sept. 29, 1967
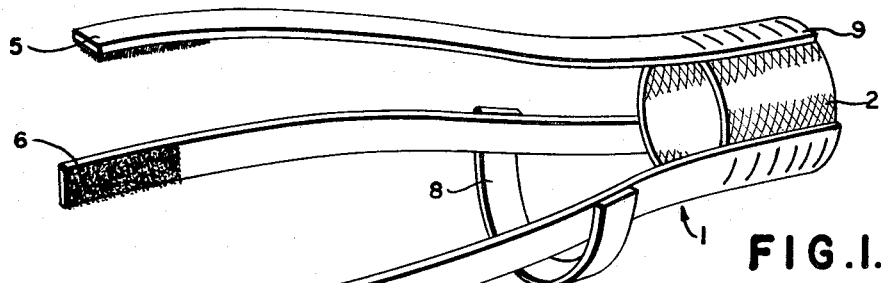
FIG.1.
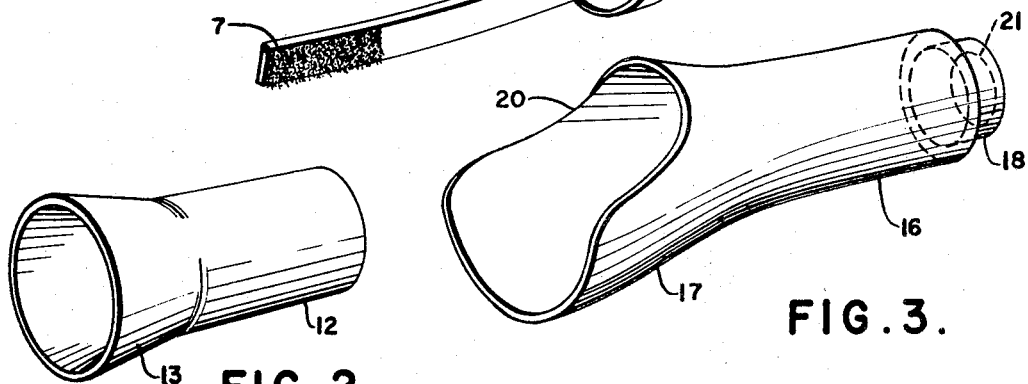
FIG.2.     FIG.3.
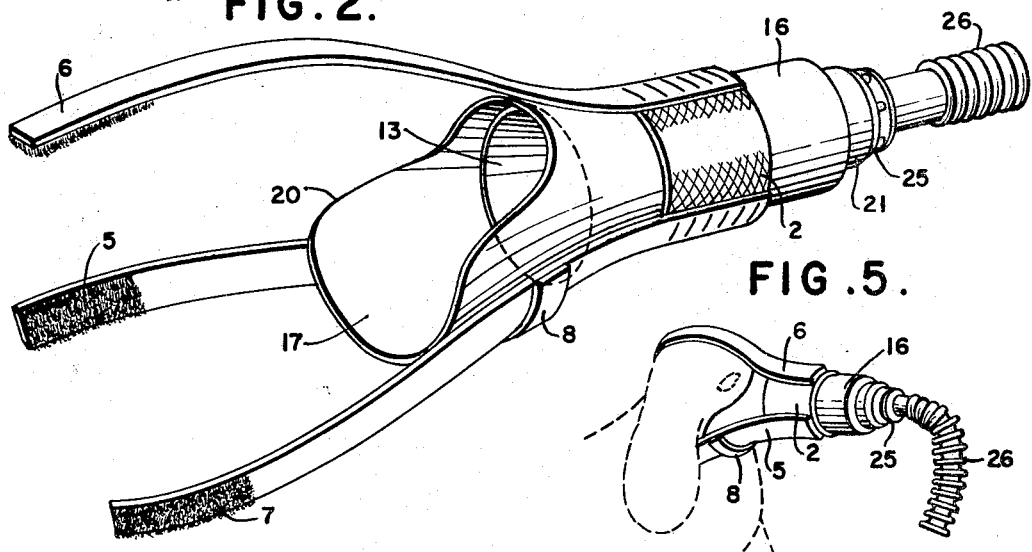
FIG.5.
FIG.6.
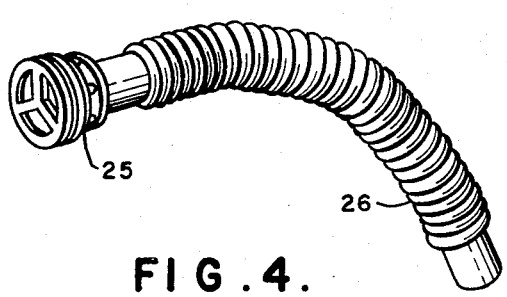
FIG.4.
INVENTORS
James R. Halstead &
BY   Richard J. Brown
ATTORNEY

United States Patent Office 3,505,998
Patented Apr. 14, 1970

3,505,998
COMBINED CANINE OXYGEN MASK WITH HARNESS
James R. Halstead, Grandview, Mo., and Richard J. Brown, Rockville, Md., assignors to the United States of America as represented by the Secretary of the Air Force
Filed Sept. 29, 1967, Ser. No. 671,886
Int. Cl. A62b 7/02
U.S. Cl. 128—146.7                              4 Claims

ABSTRACT OF THE DISCLOSURE

A canine oxygen mask having a configuration to fit over the nose and mouth of a dog receives oxygen through a valve attached to a flexible hose. The mask comprises a rubber shell having a plastic support inserted inside the rubber shell and a harness fitted over the shell to facilitate attaching the mask to the dog. The harness has straps that may use buckles or a material which adheres to itself such as "Velcro," to fasten the individual straps to each other.

Background of the invention

The present invention pertains to oxygen masks for use on dogs. The dogs are used to study decompression sickness suffered by aerospace crew members by exposing them to a decompressed atmosphere simulating an altitude of more than 35,000 feet. It is necessary that the dogs wear oxygen masks for extended periods of time.

Prior art animal masks available commercially were large, bulky, heavy devices that clamped around the animal's neck. These devices were of such a configuration that the dog would have to be anaesthetized to wear one. It was desired to have an animal mask that would be light weight, easy to handle, and would cover only the nose and mouth of the dog. Also, it was important that the device be well tolerated, thereby eliminating the need to anaesthetize the dog.

Brief summary of the invention

In the oxygen mask of the present invention, a rubber shell, having a configuration such that it fits over only the mouth and nose of a dog, has a valve attached to its small end. A flexible hose is used to supply oxygen to the rubber shell through the valve. A plastic support is placed inside the rubber shell to give the mask rigidity and strength. In order to hold the mask on the dog's face a harness fits over the rubber shell and has straps which cross behind the dog's ears and posterior to the occipital protuberance. The mask allows oxygen to be supplied to a dog by having only the mouth and nose covered. It is of light weight and comfortable enough so that the dog does not need to be anasethetized in order to tolerate the mask.

Therefore, the objects of this invention are to provide a canine oxygen mask that is of light weight, of novel configuration, fits over only the nose and mouth of the dog, and will be well tolerated by the dog.

Brief description of the drawings

The features of the invention are better understood from the following description of the preferred embodiment taken in conjunction with the accompanying drawings in which:

FIGURE 1 is a perspective view of the harness used to hold the mask onto the dog;
FIGURE 2 is a perspective view of the plastic support;
FIGURE 3 is a perspective view of the rubber shell;
FIGURE 4 is a perspective view of the valve and flexible hose;
FIGURE 5 is a perspective view of the device assembled; and
FIGURE 6 is a perspective view of the device attached to a dog, the dog being shown in dotted outline.

Description of the preferred embodiment

Referring now to FIGURE 1, the harness 1 has a hollow cylindrical portion 2 preferably of cloth or fabric. Attached to portion 2 are three straps 5, 6, and 7. The straps 5, 6, and 7 are sewn to portion 2 as indicated at 9. Cross strap 8 is sewn at its ends to straps 5 and 7. Examples of materials that may be used for straps 5, 6, and 7 are cloth and leather. Buckles may be attached to the ends of the straps 5, 6 and 7 to facilitate fastening to the dog. However, a preferred material for straps 5, 6, and 7 is a tape sold under the trademark Velcro. Two pieces of this tape will adhere to each other when pressed together, but the pieces are not adhesive to other surfaces. This tape eliminates the need for buckles.

As shown in FIGURE 2, support 12 is of a hollow cylindrical shape with an enlarged portion 13 at one end. The support is preferably made from a rigid light-weight plastic; however, it is contemplated that other light weight rigid materials, such as aluminum, may be used.

As will be seen in FIGURE 3, the shell 16 is of a hollow cylindrical shape with an enlarged portion 17 at one end and a necked down portion 18 at the opposite end. Enlarged portion 17 is cut away as at 20 to provide for the eyes of the dog. Necked down portion 18 has an opening through which the oxygen is received via valve 25 connected to hose 26 as shown in FIGURE 4. The shell 16 is made of a flexible resilient material, preferably of latex rubber.

In assembling the mask, the support 12 is inserted into the shell 16 with enlarged portion 13 of support 12 concentric with and fitting against the enlarged portion 17 of shell 16 as shown in FIGURE 5. Support 12 is of a size relative to shell 16 so that the enlarged portion 13 does not extend into the cut away portion 20. Valve 25 is attached to shell 16 so as to supply oxygen through opening 21. The harness 1 is fitted around shell 16 with strap 8 engaging enlarged portion 17.

As shown in FIGURE 6, the mask is attached to the dog after assembly by inserting the enlarged portion 17 over the muzzle of the dog with the cutaway portion 20 positioned to the upper part of the dog's head. Straps 5 and 7 course upward behind the ears and strap 6 crosses over the top of the head. The straps 5, 6, and 7 cross posterior to the occipital protuberance and in this manner hold the mask onto the dog.

While the mask has been described for use in experimental work, it will be useful in administering inhaled anaestetics and in pulmonary therapy with inhalants.

Although a specific embodiment has been disclosed, it is obvious that changes may be made within the scope of the invention and we intend to be limited only by a broad interpretation of the appended claims.

We claim:
1. A canine oxygen mask comprising: a flexible resilient shell of hollow cylindrical shape with an enlarged portion at one end thereof that generally conforms to the shape of an animal's muzzle and having a part of the larged portion cut away, a rigid support of hollow cylindrical shape with an enlarged portion at one end thereof to confirm to said enlarged portion of said shell, said support fitted concentric with and wholly within said shell and removable from only the enlarged end of said shell, a harness fitted around said shell for attaching said mask over the muzzle of an animal, and means to supply a breathable gas to the smaller end of said shell.

2. A canine oxygen mask according to claim 1 wherein said harness has a hollow cylindrical portion and three straps attached at one end to the cylindrical portion, the cylindrical portion of said harness fitted around said shell, and the other ends of said straps having an attachment means which is of a type that will adhere only to another piece of the same type whereby said mask may be quickly attached to the head of said animal.

3. A canine oxygen mask according to claim 1 wherein said harness includes an attachment means which is of a type that will adhere only to another piece of the same type.

4. A canine oxygen mask according to claim 1 wherein said shell is of rubber and said support is of a light weight plastic.

References Cited

UNITED STATES PATENTS

| 2,127,136 | 8/1938 | Pobirs | 128—205 |
| 2,960,985 | 11/1960 | Wiese | 128—188 |
| 2,312,714 | 3/1943 | Herbin | 128—146 X |
| 3,330,274 | 7/1967 | Bennett | 128—146.7 |

FOREIGN PATENTS

| 859,106 | 12/1940 | France. |
| 863,791 | 4/1941 | France. |

ANTON O. OECHSLE, Primary Examiner

T. ZACK, Assistant Examiner

U.S. Cl. X.R.

128—205